United States Patent Office 3,176,039
Patented Mar. 30, 1965

3,176,039
PROCESS OF PREPARING CARBOXYLIC ESTERS
Allan S. Hay, Schenectady, N.Y., assignor to General
Electric Company, a corporation of New York
No Drawing. Filed Apr. 12, 1962, Ser. No. 186,869
6 Claims. (Cl. 260—488)

This invention relates to a process of preparing esters by reacting oxygen under anhydrous conditions with an organic compound containing a —CH$_2$— group adjacent to a

group in a solution of a carboxylic acid also containing dissolved therein a metal salt of a carboxylic acid and a catalyst consisting essentially of a combination of cobalt, carboxylic acid and bromine. The

group may be present either in olefinic or aromatic compounds and the —CH$_2$— group may be —CH$_3$.

In my U.S. Patent 2,992,272, I have disclosed and claimed a process of oxidizing olefinic hydrocarbons to carbonyl derivatives. In this reaction, it is the saturated α-carbon atom adjacent to the olefinic group which is oxidized to the carbonyl group, for example, acrylic acid from propylene, α-phenyl acrylic acid from α-methyl styrene, etc. In my copending application, Serial No. 641,845, filed February 25, 1957, now Patent No. 3,139,452 and assigned to the same assignee as the present invention, I have disclosed and claimed a process for oxidizing aralkyl compounds to carbonyl derivatives. In this reaction, it is the saturated α-carbon atom adjacent to the aryl nucleus which is oxidized to the carbonyl group, for example, toluene is oxidized to benzoic acid, ethyl benzene to acetophenone.

I have now discovered that if either of these processes is carried out under completely anhydrous conditions, in the presence of an alkali or alkaline earth metal salt of a carboxylic acid and a carboxylic acid, that esters are obtained as the principal products instead of carbonyl derivatives, i.e., benzyl acetate from toluene, α-methylbenzyl acetate from ethyl benzene, α-acetoxy methyl styrene from methyl styrene, etc.

In carrying out the process of the present invention, a solution is made of the organic compound containing a —CH$_2$— group adjacent to a

group, hereinafter generally spoken of as starting organic compound, in a suitable solvent which also contains either as the solvent or in addition to a solvent a carboxylic acid, an alkali metal or alkaline earth metal salt of a carboxylic acid and a catalyst consisting essentially of a combination of cobalt, bromine, and a carboxylic acid (also referred to as the "cobalt-bromine-carboxylic catalyst" or "catalyst"). The solvent preferably is the same compound as at least one of the products of the oxidation reaction or it may be the carboxylic acid which will form the ester product of the reaction. Oxygen is passed into the solution contained in a suitable reaction vessel which may be heated to any desired reaction temperature. After the reaction is completed, the ester products are separated from the reaction mixture by conventional methods. The process can also be carried out in a continuous manner by continuously adding both the starting organic material and oxygen to a solution of a cobalt-bromine-carboxylic catalyst in a solvent. Alternatively, a part of the catalyst may be present in one part of the system while the other part of the catalyst is added with the reactant. Thus, the cobalt constituent can be present in the solvent and the bromine constituent added with the organic compound. By using the mother liquid of a prior run in a subsequent run, one can continuously reuse the catalyst.

The compounds which may be oxidized to esters by this process are those organic compounds having a —CH$_2$— group adjacent to a

group. The latter group may be olefinic or aromatic and therefore the compounds which may be utilized in this process include alkenes having at least 3 carbon atoms, aryl-substituted alkanes and aryl-substituted alkenes in which the aryl group of the latter two may be substituted with halogens and/or carboxyl groups wherein the carboxyl groups are present either as —COOH groups or as alkyl, aryl or haloaryl esters of the said carboxyl groups. Typical of the alkenes which may be oxidized include propene (propylene); the butene isomers, e.g., butene-1, butene-2, isobutylene; the pentene isomers, e.g., pentene-1, 2-methylbutene-1, 3-methylbutene-1; cyclohexene; the isomers of hexene, heptene, octene, hexadiene, octadecene; etc. Typical of the aryl-substituted alkanes are, for example toluene, xylene, mesitylene, ethylbenzene, propylbenzene, butylbenzene, octylbenzene, methylnaphthalene, ethylnaphthalene, etc., including those compounds where one or more of the aryl nuclei are substituted with one or more halogen and/or carboxyl groups, for example, mono-, di-, tri-, tetra- and pentachlorotoluene, the fluorotoluenes, the bromotoluenes, the iodotoluenes, the chloroxylenes, the methylchloronaphthalenes, ortho-, meta- and paratoluic acids, the ethylbenzoic acids, the dimethylbenzoic acids, the methylphthalic acids, the octyl benzoic acids, the methylnaphthylbenzoic acids, mono-, di-, tri- and tetrachlorotoluic acids, the fluorotoluic acids, the bromotoluic acids, the iodotoluic acids, the methylchlorobenzoic acids, the methylchlorophthalic acids, etc. Typical of the aryl-substituted alkenes are, for example, β-methylstyrene, α-methylstyrene, vinyl toluene, vinylmethylnaphthalene, the α-methylchlorostyrenes, the α-ethylbromostyrenes, the α-propyliodostyrenes, the α-butylfluorostyrenes, the vinyltoluic acids, etc. It will be noted that all of these compounds are characterized by having one —CH$_2$— group adjacent to a

group. By the process of the present invention it is possible to prepare a wide variety of esters from aralkyl and olefinic compounds without first having to produce the corresponding alcohol which must then be esterified with an acid.

Although I do not wish to be bound by theory, it is believed that the cobalt, bromine and carboxylic acid constituents of the catalyst combine in some unusual manner to produce the unique catalyst of this invention. The catalyst may be considered to consist essentially of a cobalt residue of a cobalt salt, the acyl residue of a carboxylic acid and the bromide residue of a salt or hydrogen bromide. Elemental bromine is capable of producing the bromine constituent of the catalyst in situ. All of these components are essential to produce an active catalyst. The combination is so unique that the substitution of other elements for one or more component either totally stops or substantially impedes the reaction. Thus, little catalytic action is obtained when appreciable amounts of other substances which usually make excellent oxidation catalysts are present during the reaction. For example, the presence of appreciable amounts of dissolved cationic compounds of iron, copper, etc. in the reaction mixture substantially stops the reaction. Similarly, the presence of appreciable amounts of anions, such as sulfate, nitrate, chlorate, etc. ions inhibit the activity of this unique catalyst. These substances interfere with the reaction only when present in ionic form and then because they react with the catalyst to form cobalt compounds which are not catalytically reactive. Therefore, they only completely inactivate the catalyst when they are present in amounts which are chemically equivalent to the amount of cobalt present as the catalyst. Compounds which contain such groups as substituents which do not produce these groups in ionic form during the reaction will not interfere with the reaction and, if they do not produce such ions in sufficient quantity to completely inactivate the catalyst, they will retard but not stop the reaction. Because of this, I prefer to use a reaction mixture, including the catalyst system which is essentially free of any components which impede the reaction. The substitution of other halogens, such as chlorine for bromine, imparts to the catalyst no appreciably greater catalytic activity, than is found in cobalt acetate, one of the usual prior art catalysts. The presence of iodine in elemental or ionic form completely inactivates the catalyst, but may be present in compounds, for example, as a nuclear substituent on aryl compounds, which do not release iodine in elemental or ionic form during the reaction.

The atomic ratio of cobalt to bromine is important for maximum reaction rates. Optimum reaction rates are obtained when cobalt and bromine are present in substantially equiatomic amounts (i.e. 0.9–1.1 atoms of bromine per atom of cobalt). The rate of reaction decreases rapidly as the bromine-to-cobalt atomic ratio is increased, and conversely, as the bromine-to-cobalt atomic ratio is decreased from unity there is a decrease in activity although this decrease is less marked. I have found that a bromine-to-cobalt atomic ratio of 2, i.e., two atoms of bromine per atom of cobalt, substantially stops the reaction and that the reaction proceeds at a slow rate even at as low a ratio as 0.008. Although in practice I prefer to employ bromine-to-cobalt atomic ratios of about 0.3 to 1, ratios of 0.1 to 1.2 give satisfactory results. However, ratios of 0.008 to 1.9 can also be used. Although an initial bromine-to-cobalt atomic ratio of 2 substantially stops the reaction, bromine losses may occur during the reaction or during a continuous or a multi-cycle reaction wherein the mother liquor is continuously reused, thus permitting the addition of more bromine, if desired. However, the catalytically effective bromine-to-cobalt ratio should not be equal to or greater than 2.

The molar ratio of a carboxylic acid-to-cobalt has no upper limit with the result that carboxylic acids can be employed as solvents for the reaction. Although relatively small amounts of carboxylic acids can be used to effect oxidation, it is to be remembered that 1 mole of a monocarboxylic acid or an equivalent amount of a polycarboxylic acid mus be present for each ester group being formed in the product. For optimum yield and rates, it is preferable to employ large amounts of carboxylic acid, preferably in solvent quantities.

The cobalt constituent of the catalyst is furnished by cobalt compounds in the divalent or trivalent state. Most simple cobalt salts can be isolated as stable solids only in the form of divalent salts, but trivalent cobalt salts such as cobaltic acetate, cobaltic hydroxide, cobaltic carbonate, are known. The latter two compounds and the corresponding cobaltous hydroxide and carbonate as well as the oxides of cobalt are a convenient source of cobalt for the catalyst when it is desired to use the same carboxylic acid used as a solvent as the source of carboxylic acid constituent of the catalyst system. Specific divalent cobalt compounds include cobalt bromide and cobalt salts of carboxylic acids which may be the same or a different carboxylic acid used as the solvent. Where the reaction is carried out in the presence of a large amount of a carboxylic acid, for example, acetic acid, cobalt, regardless of its initial form, generally takes the form of the salt of the carboxylic acid used as solvent in the reaction mixture, e.g., the acetate when acetic acid is the solvent. Therefore, any cobalt salt of the type described which is soluble in the solvent employed in an amount sufficient to form the catalyst and does not introduce interfering ions, is satisfactory for the process. Because of its availability, the preferred source of cobalt is cobaltous acetate tetrahydrate (also referred to as "Co(OAc)$_2$.4H$_2$O") which may be used in conjunction with cobalt bromide. However, other suitable cobalt catalysts include the cobaltous salts of other lower aliphatic acids, such as, for example, cobalt salts of the acids produced in the reaction, cobaltous propionate, cobaltous butyrate, cobaltous 2-bromobutyrate, cobaltous hydroxystearate, cobaltous succinate, the mono-cobalt salt of succinic acid, the cobalt salt of the monoethyl ester of succinic acid, cobaltous levulinate, cobaltous tartrate, cobaltous ethoxybutyrate, etc. In addition, cobaltous salts of aromatic carboxylic acids may also be employed as catalysts. Thus, I can employ salts such as cobaltous benzoate, cobaltous (ethylthio)benzoate, cobaltous (methylsulfinyl) benzoate, cobaltous (phenylsulfonyl) benzoate, cobaltous fluorobenzoate, cobaltous chlorobenzoate, cobaltous bromobenzoate, cobaltous iodobenzoate, cobaitous toluate, cobaltous terephthalate, the monocobalt salt of isophthalic acid, the cobalt salt of the monomethyl ester of o-phthalic acid, cobaltous napththalenecarboxylate, etc. Inorganic cobalt salts of anions that inactivate the catalyst should be avoided, for example, cobalt salts containing sulfate, nitrate, iodide, iodate, chlorate, etc., ions.

The bromine constituent of the catalyst is generally furnished by bromine compounds containing bromine capable of being readily removed from the parent compound, i.e., compounds containing a labile bromine atom. Such compounds are precursors of bromine or hydrogen bromide, which is formed during the oxidation reaction to supply the bromine constituent of the catalyst. Specific compounds include the bromocarboxylic acids, for example, the bromoaliphatic acids, e.g., the bromoacetic acids, the bromopropionic acids, the bromobutyric acids, the bromosuccinic acids, etc., cycloaliphatic carboxylic acids containing removable bromine, for example α-bromocyclohexanecarboxylic acid, etc.; free bromine (i.e. Br$_2$); acid bromides, for example, acetyl bromide, etc.; bromocarbons containing bromine capable of being readily removed from the parent compound, for example, bromochloroform, etc.; hydrogen bromide, cobalt bromide, etc., bromine salts of the alkali and alkaline earth metals, etc. I have found that one mole of HBr per mole of cobalt acetate produces an extremely active catalyst.

The carboxylic acid constituent of the catalyst is generally furnished by carboxylic acids or salts of carboxylic acids. Examples of carboxylic acids and salts comprise those carboxylic acids hereinafter mentioned as solvents and the previously mentioned cobalt salts containing carboxylate groups. Other sources of the carboxylic acid constituent comprise compounds capable of forming carboxylic acids in situ even in very small amounts, e.g., acid anhydrides, acid bromides, etc.

The metal salt of the carboxylic acid may be the lithium, sodium, potassium, rubidium, cesium, calcium, barium or strontium salt of any of the carboxylic acids named above. It may be added in the preformed state or it may be formed by addition of the appropriate base to the carboxylic acid, especially if carboxylic acid is being used as the solvent, or an alkali metal or alkaline earth metal bromide may be added to simultaneously supply the bromine constituent of the catalyst as well as producing the metal carboxylate.

A wide variety of solvents may be employed in the reaction with maximum yields being obtained with inert solvents which do not adversely affect the reaction and in which both reactant and catalyst are soluble, for example, aromatic and aliphatic hydrocarbons, esters, etc. However, solvents which are oxidized during the reaction, e.g., the starting material, etc., may likewise be used as solvents. When the starting material is used as solvent, the product becomes the solvent during the latter part of the reaction. Because carboxylic acids make excellent solvents for both the reactant and catalyst, they are the preferred solvents. Since carboxylic acids form part of the catalyst, enter into the reaction to form the ester products, and there is no upper limit to the amount of carboxylic acid the reaction will tolerate, these solvents can be used as the source of the carboxylic acid constituent of the catalyst as well as the solvent. For obvious reasons, it is highly desirable to use a carboxylic acid which is liquid at room temperature although solid carboxylic acids can be used in conjunction with other solvents or under liquefying conditions. Thus, benzoic acid dissolved in benzene or in the alkyl compound itself has been used as a combined solvent and source of carboxylic acid constituent of the catalyst system. Examples of other carboxylic acids comprise aliphatic carboxylic acids, for example, acetic, propionic, butyric, succinic, tartaric, levulinic, bromobutyric, etc., acids, cycloaliphatic carboxylic acids, for example, naphthenic acid, cyclohexanecarboxylic acid, etc. In addition, carboxylic acid precursors, such as carboxylic anhydrides, for example, acetic anhydride, etc., can also be employed. These anhydrides can serve as solvents and as a means for removing water, thus maintaining the reaction medium anhydrous and can furnish the carboxylic acid constituent of the catalyst. Mixtures of these acids with other solvents can also be employed, for example, mixtures of acetic acid with acetophenone, etc. As a class, the lower aliphatic carboxylic acids are preferred as solvents when not using the products of the oxidation reaction as solvents. The specific lower carboxylic acids preferred are those which are liquid at room temperature and especially acetic and propionic acids.

As will be readily apparent to those skilled in the art, if it is desired to produce a single ester rather than a mixture of esters, the acyl residue of the carboxylic acid used as a solvent and of the carboxylic acid present to form the ester and the carboxylic acid constituent of the catalyst system as well as the acyl residue of the carboxylic acid salt of the alkali or alkaline earth metal present in the reaction medium should all be the same, for example, if the ester product desired is an acetate, then acetic acid should be present and also used as the solvent if a carboxylic acid is being used as the solvent, cobalt acetate should furnish the acetate constituent of the catalyst and either an alkali or alkaline earth metal acetate should be used for the salt. Correspondingly, if benzoate esters are desired, then benzoic acid and a benzoate salt should be used in the reaction mixture.

From the above discussion it is seen that the catalyst constituents can be selected from a wide variety of starting materials. A single compound which would meet all the requirements of the catalyst would be a cobalt salt of both hydrogen bromide and a carboxylic acid, for example, cobalt bromide acetate. However, these compounds are not readily available and offer no advantage over a binary mixture of equimolar amounts of a cobalt salt of a carboxylic acid, for example, cobalt acetate, etc., and a bromine compound, for example, cobalt bromide, hydrogen bromide, bromine, etc. All of these would give a ratio of one atom of bromine to one atom of cobalt, i.e., a bromine-to-cobalt ratio of 1, but by varying the proportions in the binary mixture any desired ratio may be obtained. Ternary mixtures may be used to form the catalyst. For example, cobalt oxides, hydroxides, or carbonates and a bromine compound, for example, hydrogen bromide, bromine, cobalt bromide, etc., may be dissolved in a carboxylic acid to produce the catalyst.

The rate of oxygen addition to the reaction is also not critical and may vary within any desired limits. Since the final net effect of the oxygen is to oxidize the starting organic compound, the rate of reaction is dependent to some extent on the amount of oxygen present at any given time in the reaction mixture. Thus, the rate of reaction is faster with higher rate of oxygen addition than with lower rate of addition. Satisfactory results have been obtained adding oxygen to the reaction mixture at the rate of from 0.01 to 10, and preferably from 0.5 to 5 parts by weight of oxygen per hour per part of the starting organic compound. It should be understood that in addition to employing pure oxygen as the oxidizing agent in my process, it is also possible to employ any oxygen-containing gas in which the ingredient other than oxygen is inert under the conditions of the reaction. Thus, satisfactory results have been obtained employing air instead of pure oxygen in the feed gas to the reaction. In addition, the reaction proceeds satisfactorily employing mixtures of oxygen and inert gases, such as helium, neon, xenon, krypton, argon, etc. as diluents for the oxygen in the feed gas. However, in the preferred embodiment of my invention I employ either air or oxygen as the oxidizing agent.

Although the process of this invention proceeds at a rapid rate at atmospheric pressure, with certain starting organic compounds, it may be desirable to employ subatmospheric or superatmospheric pressures. Because of the low boiling points of some starting organic compounds oxidized to esters, for example the low molecular weight alkenes, it may be desirable to increase the reaction temperature by the use of superatmospheric pressure and/or increase reaction time. On the other hand, where products are formed which are capable of further reaction, i.e., have more than one reactive —$CH_2$— group adjacent to a

group, it may be advantageous to use subatmospheric pressure to remove the products as fast as they are formed.

The temperature of the reaction of the present invention may also vary within fairly wide limits. The reaction can occur with temperatures as low as room temperature (i.e. about 25° C.). However, I have found that at temperatures below about 70° C. the reaction proceeds at a relatively slow rate. Satisfactory results are obtained when running the reaction at temperatures from about 80° C. up to a temperature of about 160° C. However, I prefer to carry out the reaction at the reflux temperature of the reaction mixture. Where the reaction mixture contains a large amount of acetic acid as a solvent, and since this acid is generally the lowest boiling major constituent of the reaction mixture, it is found that the reflux temperature is near to the boiling point at atmospheric pressure of the acid, i.e., about 110–115° C.

In the oxidation of the organic compound to an ester one of the products of reaction is water. In carrying out the reaction, it is found that the presence of water has an adverse effect on the reaction. It is, therefore, essential that the reaction mixture be maintained anhydrous. This may be done by use of dehydrating agents, distillation of the water as fast as it is formed or by use of acid anhydrides.

The catalyst will be effective in the oxidation of the starting organic compound to an ester regardless of the amount present in the reaction mixture at any given time. However, since oxidation is extremely rapid and water is a product of the reaction, a controlling factor on the rate of oxidation to an ester is the rate at which water is removed. Any amount of organic compound can be present during the reaction provided anhydrous conditions can be maintained in the reaction mixture. In practice, I have obtained satisfactory results when employing in the starting mixture from 0.01 to 0.5 part by weight of the starting organic compound per part of solvent or by using the starting organic compound as its own solvent.

Preferably my reaction mixture at the start contains from 0.02 to 0.3 part by weight of the starting organic compound per part of solvent. It is obvious that where the starting organic compound is not its own solvent the ratio of starting organic compound to solvent will vary during the course of the reaction since the compound is being continuously oxidized. Slow addition of the starting organic compound to the reaction mixture is one method of keeping the rate of water production low.

The following examples are illustrative of the practice of my invention and are not intended for purposes of limitation.

*Example 1*

Oxygen was bubbled through a vigorously stirred solution of 20 grams of cobalt acetate tetrahydrate, 8 grams of sodium bromide, 26.5 grams of sodium acetate, 200 ml. of acetic acid, 186 grams of acetic anhydride and 123 grams of cyclohexene contained in a 500 ml. three-necked round bottom flask equipped with a thermometer, stirrer and water condenser which also served as a gas exit. The reaction was carried out at the reflux temperature of the mixture which initially was 80° C. and rose to 111° C. during the five-hour reaction period. At the end of this time, the reaction mixture was poured into an excess of water and the organic material extracted with ether. The ether layer was washed with sodium bicarbonate solution and dried over anhydrous magnesium sulfate. After removal of the dehydrating agent by filtration, the ether was evaporated, leaving 96 grams of a sweet smelling oil which was distilled to yield 23 grams of 3-acetoxy-cyclohexene having a boiling point of 53° C. at 6 mm. pressure and a refractive index at 20° of 1.4618. Vapor phase chromatography showed that it was pure material.

In this example, acetic anhydride was used to remove the water and maintain the reaction anhydrous. However, the reflux condenser could have been converted to a distillation condenser and the water removed as fast as it was formed by distillation. Likewise, in place of the sodium acetate, the other alkali or alkaline earth acetates could have been used.

*Example 2*

Oxygen was bubbled through a vigorously stirred solution of 8 grams of sodium bromide, 20 grams of cobalt acetate tetrahydrate, and 26.5 grams of sodium acetate in 186 grams of acetic anhydride and 200 ml. of acetic acid and 177 grams of $\alpha$-methylstyrene, in a reaction vessel similar to that used in Example 1. The reaction mixture was gradually heated and at 60° C. rapid absorption of oxygen occurred and the reaction became exothermic, with the temperature rising to 122° C. At the end of one hour reaction period, the reaction mixture was flooded with ice water and extracted with ether. The ether extract was washed with sodium bicarbonate solution and then dried. After evaporation of the ether layer, there remained 217 grams of a reddish-colored oil which was analyzed by vapor phase chromatography and found to contain 98 grams of unreacted $\alpha$-methylstyrene, 54 grams of acetophenone, and 28 grams of $\alpha$-acetoxymethylstyrene. The acetophenone was further identified by comparison of its infra red spectrum with that from a known sample of acetophenone. The $\alpha$-acetoxymethylstyrene was analyzed and found to contain 74.75, 74.61% carbon and 6.61, 7.04% hydrogen, theoretical 74.97% carbon, 6.8% hydrogen. A longer reaction time would have converted more of the $\alpha$-methylstyrene to the $\alpha$-acetoxymethylstyrene.

The above reaction was repeated using octene-1 in place of the $\alpha$-methylstyrene to produce 3-acetoxyoctene-1.

*Example 3*

Oxygen was passed through a vigorously stirred solution of 20 grams of cobalt acetate tetrahydrate, 8 grams of sodium bromide and 3.3 grams of sodium acetate dissolved in 200 ml. of acetic acid, 186 grams of acetic anhydride and 138 grams of toluene, in an apparatus similar to that described in Example 1. The temperature was gradually raised and at 70° C. the reaction became exothermic and rose rapidly to 109° C. with rapid absorption of the oxygen. At the end of the 65-minute reaction time, the reaction mixture was poured into ice water which was then extracted with ether. After washing of the ether layer with sodium bicarbonate solution, the ether layer was dried with anhydrous magnesium sulfate and then filtered. After evaporation of the ether layer there was obtained 158.9 grams of a light yellow oil which was analyzed quantitatively by means of vapor phase chromatography using known solutions for calibration. The product contained 97.2 grams of unreacted toluene, 30 grams of benzyl acetate, the balance being not further identified.

The reaction was repeated using 160 grams of p-xylene in place of the toluene and using a reaction period of 160 minutes to yield 185.44 grams of a yellow oil which was found to contain 102 grams of unreacted xylene, 23 grams of p-tolualdehyde, and 52 grams of p-methylbenzyl acetate.

*Example 4*

Oxygen was passed through a vigorously stirred solution of 20 grams of cobalt acetate tetrahydrate, 8 grams of sodium bromide and 26.5 grams of sodium acetate dissolved in 200 ml. of acetic acid, 186 grams of acetic anhydride and 159 grams of ethylbenzene contained in equipment similar to that described in Example 1. In a period of 20 minutes, the temperature was raised to 112° where the reaction mixture refluxed, and the oxygen was rapidly absorbed. The reaction was continued for a period of 3 hours. The reaction mixture worked up as described in the previous examples. There was obtained 143.2 grams of pale yellow oil containing approximately 35 grams of ethylbenzene, 35 grams of acetophenone and 25 grams of $\alpha$-methylbenzylacetate. The products which were isolated by vapor phase chromatography were further identified by comparison of the infra red spectra with that of the known compounds.

*Example 5*

Oxygen was passed into a vigorously stirred solution of 10 grams of cobalt acetate, 13.2 grams of cobalt bromide, 6.7 grams of potassium hydroxide, dissolved in 200 ml. of propionic acid, 247 grams of propionic anhydride and 138 grams of toluene. On gradually heating the reaction mixture, the reaction became exothermic at 122° C. and the absorption of oxygen became rapid. The reaction was continued for 4.25 hours at which time the reaction mixture was flooded with ice water, which was then extracted with ether. After washing the ether layer with sodium bicarbonate solution, it was dried over anhydrous magnesium sulfate and then the ether distilled. Distillation of the product yielded 42.1 grams of benzylpropionate having a boiling point of 50° C. at 0.2 mm. pressure and a refractive index at 20° of 1.4977.

While the foregoing examples have described a number of variations and modifications of the proportions of ingredients and reaction conditions which may be employed in the practice of the present invention, it should be understood that my invention is also applicable to reactants, reaction conditions and proportions of ingredients which are not specifically illustrated by the examples.

The esters prepared by the methods of this invention exhibit the same utility as the esters prepared by reaction of the corresponding alcohol and carboxylic acid. These esters may be used as plasticizers for resinous materials and those esters of aryl compounds containing carboxyl groups may be used in a self-condensation reaction with the splitting out of the carboxylic acid to produce resinous materials which may be used, for example, to produce films, fibers, or serve as insulation for electrical conductors.

From the foregoing, it is evident that a unique and versatile oxidation process has been described for the production of esters. The foregoing detailed description has been given for clearness and understanding only, and no unnecessary limitations are to be understood therefrom. The invention is not limited to the exact details shown and described, and it will be evident that obvious modifications may be made and will occur to those skilled in the art. It is obvious that my process is applicable to continuous operation and the products formed may be separated by continuous distillation. These and other modifications as well as other specific uses for the esters of this invention will be apparent to those skilled in the art without departing from my invention in its broader aspects, and I aim therefore in the appended claims to cover all such changes and modifications as fall within the true spirit and scope of my invention.

What I claim as new and desire to secure by Letters Patent of the United States is:

1. The process of preparing carboxylic esters which comprises reacting oxygen under anhydrous conditions with an organic compound containing a —CH$_2$— group adjacent to a

group, said organic compound being selected from the group consisting of alkenes having at least 3 carbon atoms, aryl-substituted alkanes, carboxyaryl-substituted alkanes, haloaryl-substituted alkanes, carboxyhaloaryl-substituted alkanes, aryl-substituted alkenes, carboxyaryl-substituted alkenes, haloaryl-substituted alkenes, and carboxyhaloaryl-substituted alkenes, said organic compound being dissolved in a solution composed essentially of (a) a catalyst consisting essentially of a combination of cobalt, a hydrocarbon carboxylic acid and bromine in which the bromine-to-cobalt atomic ratio is about 0.008 to 1.9 atoms of bromine per atom of cobalt, (b) a hydrocarbon carboxylic acid and (c) a metal salt of a hydrocarbon carboxylic acid, said metal being selected from the group consisting of alkali metals and alkaline earth metals.

2. The process of claim 1 wherein the compound oxidized is cyclohexene.
3. The process of claim 1 wherein the compound oxidized is α-methyl styrene.
4. The process of claim 1 wherein the organic compound oxidized is toluene.
5. The process of claim 1 wherein the organic compound oxidized is xylene.
6. The process of claim 1 wherein the compound oxidized is ethyl benzene.

References Cited by the Examiner
UNITED STATES PATENTS

| | | | |
|---|---|---|---|
| 2,428,590 | 10/47 | Shokal | 260—497 |
| 2,701,813 | 2/55 | Snyder | 260—497 |
| 2,907,792 | 10/59 | McIntire | 260—514 X |
| 2,974,161 | 3/61 | Keith | 260—497 X |

LORRAINE A. WEINBERGER, *Primary Examiner.*

LEON ZITVER, *Examiner.*